United States Patent
Tödteberg (10) Patent No.: US 6,342,771 B1
(45) Date of Patent: Jan. 29, 2002

(54) LABORATORY CENTRIFUGE WITH AN ELECTRIC MOTOR HEATED DURING A STOP

(75) Inventor: Eckhard Tödteberg, Osterode (DE)

(73) Assignee: Sigma Laborzentrifugen GmbH, Osterode (DE)

( * ) Notice: Subject to any disclaimer, the term of this patent is extended or adjusted under 35 U.S.C. 154(b) by 0 days.

(21) Appl. No.: 09/554,987

(22) PCT Filed: Sep. 14, 1998

(86) PCT No.: PCT/EP98/05831

§ 371 Date: May 23, 2000

§ 102(e) Date: May 23, 2000

(87) PCT Pub. No.: WO99/29431

PCT Pub. Date: Jun. 17, 1999

(30) Foreign Application Priority Data

Dec. 5, 1997 (DE) .......................... 297 21 563

(51) Int. Cl.[7] .............................. B04B 9/04; B04B 15/02
(52) U.S. Cl. ......................................... 318/436; 388/924
(58) Field of Search ........................ 318/436; 388/924; 422/50, 63, 68.1, 72

(56) References Cited

U.S. PATENT DOCUMENTS

| | | | |
|---|---|---|---|
| 3,600,900 A | * | 8/1971 | Buddecke |
| 4,193,536 A | * | 3/1980 | Kubota |
| 4,195,324 A | | 3/1980 | Waltz ............................ 361/25 |
| 4,498,896 A | * | 2/1985 | Leis |
| 5,631,509 A | | 5/1997 | Crowell ......................... 310/68 |
| 5,772,572 A | * | 6/1998 | Koch et al. |

FOREIGN PATENT DOCUMENTS

| | | |
|---|---|---|
| DE | 41 05 733 | 8/1992 |
| EP | 0 295 377 | 12/1988 |
| GB | 2 150 717 | 7/1985 |
| WO | 90 01372 | 2/1990 |

* cited by examiner

*Primary Examiner*—Bentsu Ro
(74) *Attorney, Agent, or Firm*—Synnestvedt & Lechner LLP (57) ABSTRACT

A laboratory centrifuge, whose centrifuge rotor is mounted in a bowl (6) which can be brought to the correct temperature and which is set up in particular for the setting of temperatures below the ambient temperature, is provided with a drive means comprising at least one electric motor (1) which is equipped with standstill heating means to maintain the temperature within the motor above a dew point temperature independent of a material-specific cooling temperature within the bowl (6). The standstill heating is provided by the winding system of the stator and/or of the rotor of the electric motor (1) and is connected to a control device (21). The formation of condensation within the motor and the consequential adverse effects arising from this, such as for example corrosion damage to electrical contacts as well as to the bearings of the motor shaft, can be avoided by this means. Also, no additional components are needed for the actual standstill heating.

19 Claims, 1 Drawing Sheet

FIG.1

LABORATORY CENTRIFUGE WITH AN ELECTRIC MOTOR HEATED DURING A STOP

The invention relates to a laboratory centrifuge according to the preamble of claim 1.

Laboratory centrifuges, particularly for the medicinal-pharmaceutical field, are known in many forms. They consist of a housing which can be closed at the top by a cover and within which is a centrifuge rotor which is connected to an electrical drive and which is suspended so that it can oscillate. The centrifuge rotor is provided in the peripheral region with a plurality of exchangeable receptacles which are intended for receiving a mixture of substances which are to be treated by the centrifuging process. These processes must be carried out in dependence upon the chemical-physical properties of the mixture of substances under pressure and temperature conditions which deviate from the ambient conditions. In general, this requires a special design of the centrifuge housing, particularly the mounting of the centrifuge rotor within a bowl whose interior space can be brought to the right temperature, in particular can be cooled.

In order to carry out a centrifuging treatment at reduced temperatures, the interior chamber of the said bowl is cooled down to the particular product-specific temperature, initially with the drive at a standstill, and with the actual centrifuging treatment only beginning after this temperature has been achieved.

From GB2150717A there is known a laboratory centrifuge which is set up to the effect that the centrifuging process is carried out independently of the speed of rotation of the rotor and in accordance with a constant temperature. For this purpose the bowl which contains the rotor is provided with a temperature sensor by means of which, in combination with a control device, a circulation of coolant is brought into use according to the deviation of the measured temperature from a reference temperature, with the object of maintaining a constant temperature within the internal chamber of the bowl.

However, depending upon the cooling of the internal chamber of the bowl and of the centrifuge rotor there results a series of problems in the region of the electrical drive, which can be traced back to the thermal effect due to the cold rotor body and/or parts of the bowl. Thus, the cooling of parts of the motor as a result of thermal conduction and radiation leads to the formation of condensation which can trigger significant consequential damage, for example corrosion effects in the region of electrical contacts, a corrosive seizing up of the movable bearings of the two bearings of the motor shaft etc., so that finally, depending upon the magnitude of the damage which has occurred, one has to reckon on functional breakdowns, with this leading for its part to expensive repair work.

These problems arise only when the centrifuge rotor is at a standstill, since when the rotor is running no condensation occurs because of the inherent heating of the electrical drive and a sufficient movement of air, even at low temperatures of the centrifuge rotor.

From US5631509 it is known to equip an electrical drive with thermostatically controlled heating elements, and indeed with the object of heating its winding system, namely to avoid the formation of condensation and the consequential problems arising from this. The thermostat is set up so that the heating elements can be effective only when the electrical drive is at a standstill and so that a heating is carried out until the achievement of a minimum, pre-set temperature step above the ambient temperature.

From US4195324 there is known a further electrical drive which is equipped with auxiliary heating to avoid the formation of condensation. The electrical drive includes a three-phase alternating current motor, wherein one phase is electrically powered for the purpose of increasing the winding temperature above the dew point temperature of the surroundings.

It is a feature of these known electrical drives equipped with a standstill heating for suppressing the formation of condensation that the heating power to be installed within the framework of its standstill heating is only related to the ambient temperature. Undercooling due to the use of the electrical drive within a total machine, and the danger of the formation of condensation connected with this, is not addressed by these prior art documents.

These problems arise only when the centrifuge rotor is at a standstill, since when the rotor is running no condensation occurs because of the inherent heating of the electrical drive and a sufficient movement of air, even at low temperatures of the centrifuge rotor.

It is the object of the invention to provide a laboratory centrifuge of the type first mentioned above in which, in a simple way, the occurrence of condensation within the electrical drive when the centrifuge is at a standstill as a result of a process-dependent cooling of the centrifuge rotor is suppressed and the consequential damage arising from that can be avoided. This object is achieved in a laboratory centrifuge of the type referred to above by the features of the characterising portion of claim 1.

It is an essential feature of the invention to provide standstill heating which is effective exclusively when the centrifuge is at a standstill and preferably only if the actual centrifuging process is preceded by a product-specific cooling. The heating power which is introduced through the standstill heating is in each case of a magnitude so that at no position within the electric motor does the temperature fall below a dew point, so that a thermal effect on motor components arising from a cooling of the centrifuge motor is compensated in each case. The standstill heating must take into account these requirements as well as the heating power and also surface and spatial effects. If these conditions are fulfilled, then any suitable, preferably electrical, heating system can be utilized. The standstill heating is connected with an overall control, by means of which the heating is automatically actuatable, as soon as the initially mentioned conditions arise, namely after a cooling of the centrifuge motor and of the internal chamber of the bowl which holds the rotor, with the electric motor at a standstill.

According to the features of claim 2, the standstill heating means provides a fixed heating power which is of a magnitude such that even under the most unfavorable conditions, i.e. the lowest possible temperature of the centrifuge rotor, there is a sufficient heating of the motor to achieve the object first set out above. Within this framework, for example, the internal chamber temperature of the motor can be maintained at about 60° C. and the heating power to maintain this temperature can be determined.

According to the features of claim 3, the power supplied by way of the standstill heating can be variable, and indeed according to a measure of the internal temperature of the bowl or of some other measured temperature value which at least approximately matches the cooling of the centrifuge rotor and from which a perceptible cooling of the motor components arises. In this case, the heating power supplied by way of the standstill heating matches the actual cooling.

The features of claim 4 are directed to a technical realisation of the last-mentioned concept, and for this there is provided a temperature sensor for detecting a measured temperature value of the bowl which is transferred to a control circuit by means of which the heating power of the standstill heating is controllable. The temperature sensor for this purpose can detect for example the temperature of the metallic bowl wall from which there is a proportional thermal effect on the motor components.

According to the features of claim 5, the standstill heating is effected directly through the winding system of the stator and/or the rotor of the electric motor. This brings about first of all the advantage that for the technical realisation of the standstill heating no additional component needs to be added to the structure of the motor. On the contrary, use is made of items which are already present. The particular winding system and the particular winding systems are electrically powered in such a way that no rotational movement results, but only a heating which is of a magnitude to achieve the object described above, namely to avoid falling below a dew point within the motor. This can be achieved by a powering of the winding system according to an input voltage and an input frequency matched to these conditions. This is applicable independently of other electric motor principles, for example whether the motor is a DC motor, a single phase AC motor or a multi-phase AC motor. The standstill heating means can be connected into a control circuit by means of which it is activatable according to predeterminable conditions and a predeterminable heating power. This control circuit can be integrated into the control of the motor which is otherwise provided, which on the input side is powered only by a measured temperature value which indicates the temperature of the centrifuge rotor and of the bowl. Even with the control of the heating power, in this way use can be made to the greatest possible extent of the possibilities of an electrical drive which are already present, in relation to the voltage and frequency controls, and indeed the stator winding system and also the rotor winding system. This means that conventional laboratory centrifuges can be converted at comparatively little expense, thereby to be in accordance with the present invention.

The invention will now be described in more detail with reference to the embodiment which is shown by way of example in the accompanying drawing.

Figure 1:
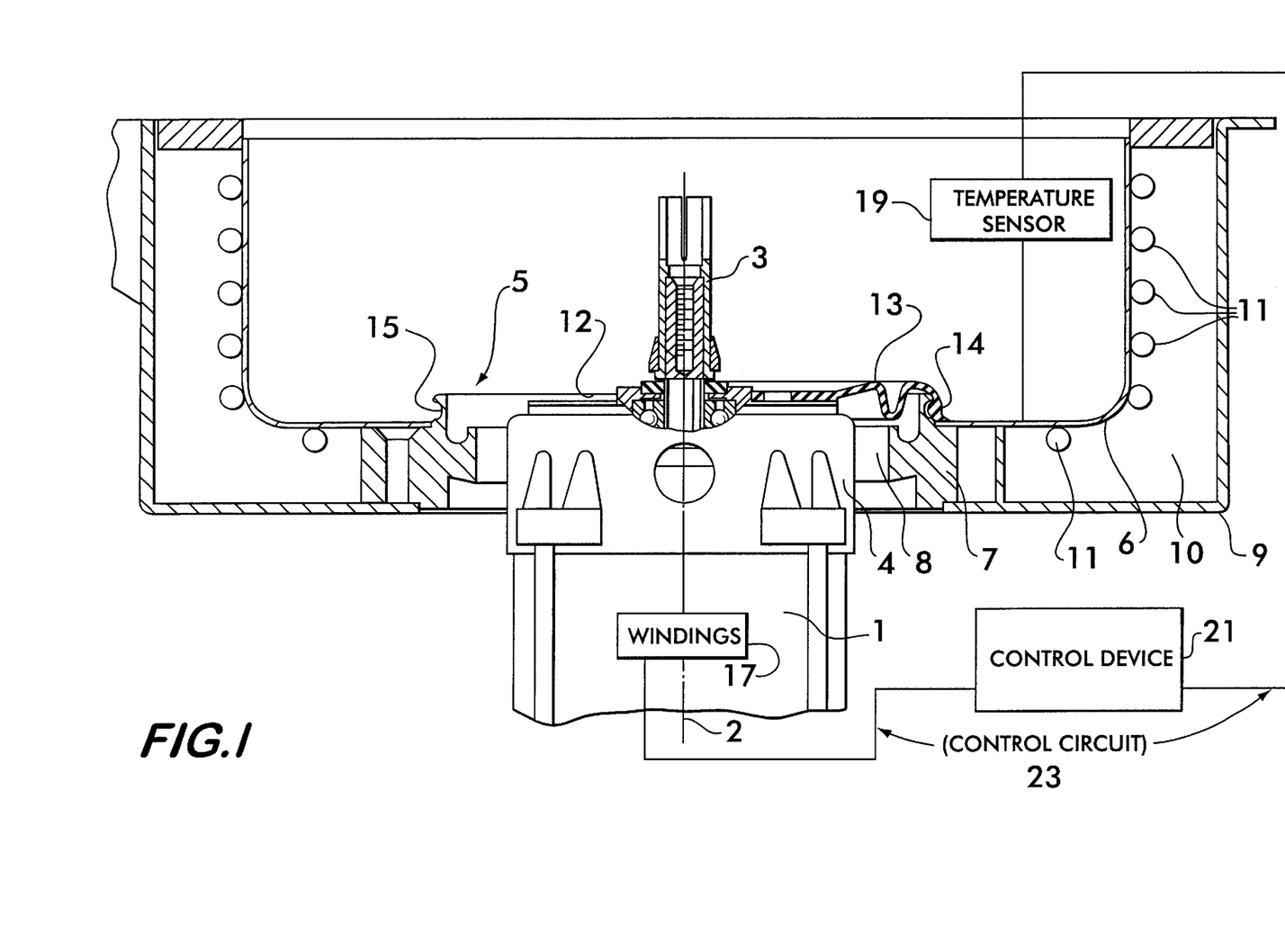
FIG. 1 is a cross-sectional view of an exemplary laboratory centrifuge according to the present invention.

The FIGURE of the drawing shows, in longitudinal section and as a partial illustration, a laboratory centrifuge, and in particular its drive components. In particular, reference numeral 1 indicates an electric motor whose vertically positioned shaft 2 is provided at its free end which projects from the motor with a coupling member 3 which is designed and installed for connection with a centrifuge rotor which is not shown in the drawing. The motor housing, particularly its upper part 4 which includes inter alia a bearing cap, is located within an aperture 5 of a bowl 6, the aperture extending concentrically in relation to the shaft 2 and being in the bottom of the bowl. The bowl 6 serves to receive the centrifuge rotor and is closeable at the top by a cover which is likewise not shown in the drawing. The aperture 5 of the bowl 6 is encircled by an abutment ring 7 which surrounds the said upper part 4 of the electric motor 1 with a radial spacing which leaves an annular gap 8. The abutment ring 7 is connected on the one hand to the bowl 6 and on the other hand to a housing wall 9 which is spaced from the outside of the bowl 6 and which consequently surrounds it leaving an intermediate enveloping chamber 10. The distance between the housing wall 9 and the bowl 6 can be mechanically stabilised by various mounting fixtures.

Within the enveloping chamber 10, and indeed in direct contact with the outside of the bowl 6, there is located a system for the guidance of a cooling medium within pipes 11 which overlie the outside surface of the bowl 6 and in particular are in sufficient heat-conductive contact therewith. The system of pipes 11 is connected into a circulating circuit which is not shown in the drawing and which inter alia includes a heat sink in order to take away the heat received through the walls of the bowl 6. Likewise, a control system 21 which for example detects the temperature of the bowl wall is designed and installed for controlling the heat conveyed through the pipes 11 for the purpose of setting a defined internal temperature within the bowl 6.

On the face end 12 of the upper part 4 is fixed a collar consisting of an elastic rubber material for example and which overlies the end 12 on the side facing the bowl chamber. The collar 13 in particular overlies the annular gap 8 and its outer margin is fixed by means of a shaped bead 14 in an annular groove 15 of the abutment ring 7, the groove extending concentrically in relation to the shaft 2.

The materials to be treated by means of such a laboratory centrifuge are located in the receptacles which are not shown in the drawing and which are receivable in the centrifuge rotor mentioned above. Frequently, this treatment takes place, depending upon the properties of these materials, at temperatures which are lower than the ambient temperature, and it is for this purpose that one first sets up within the bowl a product-specific temperature by means of a coolant flowing through the pipes 11, after which the centrifuging treatment begins. Depending upon the amount of the cooling of the walls of the bowl 6 as well as of the abutment ring 7, which, particularly due to thermal radiation, results in a corresponding cooling of the housing of the electric motor 1, particularly of the upper part 4 as well as of elements which are in direct heat-conducting contact therewith, the winding system of the electric motor 1 is at this point electrically powered with a view to producing a heating of the internal chamber of the motor as well as of the parts which are thermally influenced by the bowl 6 and by the abutment ring 7, so that as a consequence at no position on these motor elements does one drop below a dew point and consequently cause the formation of condensation.

Depending upon the system of the electric motor 1, one can be talking here about a powering of stator windings 17 and/or rotor windings, and for such heating one can equally well use direct-current drives and three-phase-current drives or, generally, multiphase alternating current drives. The electrical powering of the winding system results in each case from a voltage and a frequency which cause no rotational movement of the motor. The choice of the necessary electrical parameters needed to fulfil this condition will be familiar to the skilled person and therefore do not need to be described further.

In the simplest case, the standstill heating of the electric motor 1 according to the invention is effected according to an established standardized heat-generating capability which is determined on the basis of the most unfavorable conditions, that is conditions resulting in a maximum cooling effect of the coolant flowing through the pipes 11, thereby to avoid any part of the motor which is thermally influenced by the bowl chamber falling below a dew point. The standstill heating can however be made variable, in dependence upon the actual thermal effect which is to be dealt with, in practice by means of one or more sensors 19 which detect the temperature at the critical part or parts of the thermally affected motor components, wherein the heating power to be expended is determined in dependence upon the cooling which is established in this way.

A particular advantage of the invention is to be seen in that in order to prepare for such standstill heating no additional heating elements need to be provided within the motor and, on the contrary, use is made of structural elements which are already present, namely the winding elements of the rotor and/or of the stator. Any laboratory centrifuge can be equipped in accordance with the invention in a simple manner and at low cost, with the advantage that corrosion effects caused by condensation within the motor are avoided, which can be observed both in the area of electrical contacts and also with bearing elements, thereby avoiding the significant consequential costs.

What is claimed is:

1. A laboratory centrifuge comprising:
    a bowl capable of being cooled;
    a centrifuge rotor mounted within said bowl, said centrifuge rotor being capable of receiving a plurality of receptacles for receiving materials to be treated by centrifuging;
    an electric motor for rotating said rotor;
    a standstill heating means for maintaining all points of said electric motor at a temperature above a dew point while a material-specific cooling temperature is maintained within said bowl; and
    control means for automatically activating said standstill heating means as a function of a temperature of an internal chamber of said bowl.

2. The laboratory centrifuge of claim 1, wherein said standstill heating means is activatable to provide a constant heating power.

3. The laboratory centrifuge of claim 2, further comprising:
    a control device connected to said standstill heating means for activating said standstill heating means under predeterminable conditions to provide a predeterminable heating power; wherein said standstill heating means comprises a winding system of a stator and/or a rotor of said electric motor.

4. The laboratory centrifuge of claim 1, wherein said standstill heating means is activatable to provide a variable heating power corresponding to an internal temperature of said bowl.

5. The laboratory centrifuge of claim 4, further comprising:
    a temperature sensor for detecting an internal temperature of said bowl; and
    a control circuit connected to said temperature sensor for controlling the heating power of said standstill heating means as a function of said internal temperature of said bowl.

6. The laboratory centrifuge of claim 5, further comprising:
    a control device connected to said standstill heating means for activating said standstill heating means under predeterminable conditions to provide a predeterminable heating power; wherein said standstill heating means comprises a winding system of a stator and/or a rotor of said electric motor.

7. The laboratory centrifuge of claim 4, further comprising:
    a control device connected to said standstill heating means for activating said standstill heating means under predeterminable conditions to provide a predeterminable heating power; wherein said standstill heating means comprises a winding system of a stator and/or a rotor of said electric motor.

8. The laboratory centrifuge of claim 1, further comprising:
    a temperature sensor for detecting an internal temperature of said bowl; and
    a control circuit connected to said temperature sensor for controlling the heating power of said standstill heating means as a function of said internal temperature of said bowl.

9. The laboratory centrifuge of claim 8, further comprising:
    a control device connected to said standstill heating means for activating said standstill heating means under predeterminable conditions to provide a predeterminable heating power; wherein said standstill heating means comprises a winding system of a stator and/or a rotor of said electric motor.

10. The laboratory centrifuge of claim 1, further comprising:
    a control device connected to said standstill heating means for activating said standstill heating means under predeterminable conditions to provide a predeterminable heating power; wherein said standstill heating means comprises a winding system of a stator and/or a rotor of said electric motor.

11. A method of maintaining the temperature of an electric motor of a laboratory centrifuge above a dew point when a centrifuge rotor mounted within a bowl of said centrifuge is being cooled, said method comprising:
    (a) sensing a temperature of the centrifuge;
    (b) heating said electric motor when said temperature of the centrifuge is at or below a predetermined temperature and said centrifuge rotor is not being rotated by said electric motor; and
    (c) providing sufficient heat in step (b) to maintain substantially all areas of said electric motor above the dew point.

12. The method of claim 11 wherein step (b) comprises the step of passing electric current through a winding system of said electric motor.

13. The method of claim 12 wherein step (b) comprises the step of passing electric current through a winding of a stator of said electric motor.

14. The method of claim 12 wherein step (b) comprises the step passing electric current through a rotor of said electric motor.

15. The method of claim 11 wherein said bowl has an internal chamber, and step (a) comprises the step of sensing the temperature within said internal chamber.

16. The method of claim 11 further comprises the step of controlling a heating power during said heating of step (b).

17. A laboratory centrifuge comprising:
    a bowl capable of being cooled, said bowl having an internal chamber;
    a centrifuge rotor mounted within said bowl, said centrifuge rotor being capable of receiving a plurality of receptacles for receiving materials to be treated by centrifuging;
    an electric motor for rotating said centrifuge rotor;
    a heater disposed in said centrifuge to heat all points of said electric motor to a temperature above a dew point while a cooling temperature is maintained within said bowl; and
    control means for automatically activating said heater as a function of the cooling temperature only when said centrifuge rotor is not being rotated.

18. The laboratory centrifuge of claim 17 wherein said heater is disposed within said electric motor.

19. The laboratory centrifuge of claim 18 wherein said motor includes windings, and said heater comprises said windings.

* * * * *

UNITED STATES PATENT AND TRADEMARK OFFICE
CERTIFICATE OF CORRECTION

PATENT NO. : 6,342,771 B1
DATED : January 29, 2003
INVENTOR(S) : Todteberg

It is certified that error appears in the above-identified patent and that said Letters Patent is hereby corrected as shown below:

Please delete the title page and substitute therefore the attached title page.

Delete the specification and claims in columns 1-8, to be replaced with the following specification and claims, columns 1-8, as per attached.

Signed and Sealed this

Second Day of December, 2003

JAMES E. ROGAN
*Director of the United States Patent and Trademark Office*

(12) United States Patent
Tödteberg (10) Patent No.: US 6,342,771 B1
(45) Date of Patent: Jan. 29, 2002

(54) LABORATORY CENTRIFUGE WITH AN ELECTRIC MOTOR HEATED DURING A STOP

(75) Inventor: Eckhard Tödteberg, Osterode (DE)

(73) Assignee: Sigma Laborzentrifugen GmbH, Osterode (DE)

(*) Notice: Subject to any disclaimer, the term of this patent is extended or adjusted under 35 U.S.C. 154(b) by 0 days.

(21) Appl. No.: 09/554,987

(22) PCT Filed: Sep. 14, 1998

(86) PCT No.: PCT/EP98/05831

§ 371 Date: May 23, 2000

§ 102(e) Date: May 23, 2000

(87) PCT Pub. No.: WO99/29431

PCT Pub. Date: Jun. 17, 1999

(30) Foreign Application Priority Data

Dec. 5, 1997 (DE) .................................... 297 21 563 U (51) Int. Cl.$^7$ .......................... B04B 9/04; B04B 15/02
(52) U.S. Cl. ........................................ 318/436; 388/924
(58) Field of Search .................... 318/436; 388/924; 422/50, 63, 68.1, 72

(56) References Cited

U.S. PATENT DOCUMENTS

| | | | |
|---|---|---|---|
| 3,600,900 A | * | 8/1971 | Buddecke |
| 4,193,536 A | * | 3/1980 | Kubota |
| 4,195,324 A | | 3/1980 | Waltz .................... 361/25 |
| 4,498,896 A | * | 2/1985 | Leis |
| 5,631,509 A | | 5/1997 | Crowell .................. 310/68 |
| 5,772,572 A | * | 6/1998 | Koch et al. |

FOREIGN PATENT DOCUMENTS

| | | |
|---|---|---|
| DE | 41 05 733 | 8/1992 |
| EP | 0 295 377 | 12/1988 |
| GB | 2 150 717 | 7/1985 |
| WO | 90 01372 | 2/1990 |

\* cited by examiner

Primary Examiner—Bentsu Ro
(74) Attorney, Agent, or Firm—Synnestvedt & Lechner LLP (57) ABSTRACT

A laboratory centrifuge having a rotor mounted in a bowl which can be brought to a temperature below the ambient temperature, is provided with a drive means including an electric motor equipped with standstill heating means to maintain the temperature within the motor above a dew point temperature independent of a cooling temperature within the bowl. The standstill heating is provided by the winding system of the stator and/or rotor of the electric motor and is connected to a control device. The formation of condensation within the motor and the consequential adverse effects arising from this, such as for example corrosion damage to electrical contacts as well as to the bearings of the motor shaft, can be avoided by this means. Also, no additional components are needed for the actual standstill heating.

19 Claims, 1 Drawing Sheet

LABORATORY CENTRIFUGE WITH AN ELECTRIC MOTOR HEATED DURING A STOP

FIELD OF THE INVENTION

The invention relates to a laboratory centrifuge, and more particularly to a centrifuge having means to heat the electric motor of the centrifuge.

BACKGROUND OF THE INVENTION

Laboratory centrifuges, particularly for the medicinal-pharmaceutical field, are known in many forms. They typically consist of a housing which can be closed at the top by a cover and within which is a centrifuge rotor. The centrifuge rotor is connected to an electrical drive and is suspended so that it can rotate. The centrifuge rotor is provided in the peripheral region with a plurality of exchangeable receptacles which are intended for receiving a mixture of substances which are to be treated by the centrifuging process. These processes may vary depending upon the chemical-physical properties of the mixture of substances, for example under pressure and temperature conditions which deviate from the ambient conditions. In general, this requires a special design of the centrifuge housing, particularly the mounting of the centrifuge rotor within a bowl whose interior space can be brought to the right temperature, in particular can be cooled.

To perform a centrifuging treatment at a reduced temperature, the interior chamber of the bowl is cooled to the desired temperature with the drive at a standstill. The actual centrifuging treatment is begun only after the desired temperature has been achieved.

Great Britain Patent No. 2150717A discloses a laboratory centrifuge for which the centrifuging process is carried out independently of the speed of rotation of the rotor and in accordance with a constant temperature. For this purpose the bowl which contains the rotor is provided with a temperature sensor by means of which, in combination with a control device, a circulation of coolant is brought into use according to the deviation of the measured temperature from a reference temperature, with the object of maintaining a constant temperature within the internal chamber of the bowl.

However, cooling of the internal chamber of the bowl and of the centrifuge rotor may result in problems in the region of the electrical drive due to the thermal effects of the cold rotor body and/or parts of the bowl. As a result of thermal conduction and radiation, the cooling of the motor parts leads to the formation of condensation which can cause significant consequential damage. For example, such damage may include corrosion in the region of the electrical contacts, a corrosive seizing up of bearings of the motor shaft etc. This damage may result in functional breakdowns requiring expensive repair work.

These problems arise only when the centrifuge rotor is at a standstill. When the rotor is running no condensation forms because of the inherent heating of the electrical drive and a sufficient movement of air, even at low temperatures of the centrifuge rotor.

U.S. Pat. No. 5,631,509 discloses an electrical drive with thermostatically controlled heating elements for heating its winding system to avoid the formation of condensation and the resulting problems. The thermostat is configured so that the heating elements are effective only when the electrical drive is at a standstill and so that a heating is carried out until a minimum, pre-set temperature step above the ambient temperature is achieved.

U.S. Pat. No. 4,195,324 discloses an electrical drive which is equipped with auxiliary heating to avoid the formation of condensation. The electrical drive includes a three-phase alternating current motor, wherein one phase is electrically powered for the purpose of increasing the winding temperature above the dew point temperature of the surroundings.

It is a feature of these known electrical drives equipped with a standstill heater for suppressing the formation of condensation that the heating power to be installed within the framework of its standstill heating is only related to the ambient temperature. Undercooling due to the use of a machine's electrical drive, and the danger of the formation of condensation connected with this, is not addressed by these prior art documents.

These problems arise only when the centrifuge rotor is at a standstill, since when the rotor is running no condensation occurs because of the inherent heating of the electrical drive and a sufficient movement of air, even at low temperatures of the centrifuge rotor.

SUMMARY OF THE INVENTION

It is an object of the invention to provide a laboratory centrifuge in which, in a simple way, the occurrence of condensation within the electrical drive is suppressed when the centrifuge is at a standstill as a result of a process-dependent cooling of the centrifuge rotor. This object is achieved in a laboratory centrifuge having a bowl capable of being cooled, a centrifuge rotor mounted within the bowl, and which is capable of receiving a plurality of receptacles for receiving materials to be treated by centrifuging, and an electric motor for rotating the rotor. The centrifuge further includes a standstill heating means for maintaining all points of the electric motor at a temperature above a dew point while a material-specific cooling temperature is maintained within the bowl, and control means for automatically activating the standstill heating means as a function of the temperature of an internal chamber of the bowl.

The present invention provides standstill heating which is effective exclusively when the centrifuge is at a standstill and preferably only if the actual centrifuging process is preceded by a product-specific cooling. The heating power which is introduced through the standstill heating is in each case of a magnitude so that at no position within the electric motor does the temperature fall below a dew point, so that a thermal effect on motor components arising from a cooling of the centrifuge motor is compensated for in each case. The standstill heating takes into account these requirements as well as the heating power and also surface and spatial effects. If these conditions are fulfilled, then any suitable, preferably electrical, heating system can be utilized. The standstill heating is connected with an overall control, by means of which the heating is automatically actuatable, as soon as the initially mentioned conditions arise, namely after a cooling of the centrifuge motor and of the internal chamber of the bowl which holds the rotor, with the electric motor at a standstill.

According to the features of one embodiment, the standstill heating means is activatable to provide a constant heating power. In such an embodiment, the standstill heating means provides a fixed heating power which is of a magnitude such that even under the most unfavorable conditions, i.e. the lowest possible temperature of the centrifuge rotor, there is sufficient heating of the motor to achieve the object first set out above. Accordingly, for example, the internal chamber temperature of the motor can be maintained at about 60° C. and the heating power to maintain this temperature can be determined.

According to the features of another embodiment, the standstill heating means is activatable to provide a variable heating power corresponding to an internal temperature of the bowl. In such an embodiment, the power supplied by way of the standstill heating can be variable, e.g. according to a measure of the internal temperature of the bowl or of some other measured temperature value which at least approximately matches the cooling of the centrifuge rotor and from which a perceptible cooling of the motor components arises. In this case, the heating power supplied by way of the standstill heating matches the actual cooling.

The laboratory centrifuge can further include a temperature sensor for detecting an internal temperature of the bowl, and a control circuit connected to the temperature sensor for controlling the heating power of the standstill heating means as a function of the internal temperature of the bowl. In this embodiment, the temperature sensor detects a measured temperature value of the bowl which is transferred to the control circuit by means of which the heating power of the standstill heating is controllable. The temperature sensor for this purpose can detect, for example, the temperature of the bowl wall from which there is a proportional thermal effect on the motor components.

Optionally, the laboratory centrifuge can further include a control device connected to the standstill heating means for activating the standstill heating means under predeterminable conditions to provide a predeterminable heating power, wherein the standstill heating means includes a winding system of a stator and/or a rotor of the electric motor. In such an embodiment, the standstill heating is effected directly through the winding system of the stator and/or the rotor of the electric motor. Advantageously, no additional component needs to be added to the structure of the motor. On the contrary, use is made of items which are already present. The particular winding system and the particular winding systems are electrically powered in such a way that no rotational movement results, but only a heating which is of a magnitude to achieve the object described above, namely to avoid falling below a dew point within the motor. This can be achieved by a powering of the winding system according to an input voltage and an input frequency matched to these conditions. This is applicable independently of other electric motor principles, for example whether the motor is a DC motor, a single phase AC motor or a multi-phase AC motor. The standstill heating means can be connected into a control circuit by means of which it is activatable according to predeterminable conditions and a predeterminable heating power. This control circuit can be integrated into the control of the motor which is otherwise provided, which on the input side is powered only by a measured temperature value which indicates the temperature of the centrifuge rotor and of the bowl. Even with the control of the heating power, the greatest use can be made of the possibilities of an electrical drive which are already present, in relation to the voltage and frequency controls, and the stator and rotor winding systems. This means that conventional laboratory centrifuges can be converted at relatively little expense to be in accordance with the present invention.

DETAILED DESCRIPTION OF THE INVENTION

The invention will now be described in more detail with reference to the embodiment which is shown by way of example in the accompanying drawing.

The sole FIGURE shows, in longitudinal section and as a partial illustration, a laboratory centrifuge, and in particular its drive components. In particular, reference numeral 1 indicates an electric motor whose vertically positioned shaft 2 is provided at its free end which projects from the motor with a coupling member 3 which is designed and installed for connection with a centrifuge rotor which is not shown in the drawing. The motor housing, particularly its upper part 4 which includes inter alia a bearing cap, is located within an aperture 5 of a bowl 6, the aperture extending concentrically in relation to the shaft 2 and being in the bottom of the bowl. The bowl 6 serves to receive the centrifuge rotor and is closeable at the top by a cover which is likewise not shown in the drawing. The aperture 5 of the bowl 6 is encircled by an abutment ring 7 which surrounds the upper part 4 of the electric motor 1 with a radial spacing which leaves an annular gap 8. The abutment ring 7 is connected to both the bowl 6 and a housing wall 9 which is spaced from the outside of the bowl 6 and which consequently surrounds it leaving an intermediate enveloping chamber 10. The distance between the housing wall 9 and the bowl 6 can be mechanically stabilised by various mounting fixtures.

Within the enveloping chamber 10, and in direct contact with the outside of the bowl 6, there is located a system for the guidance of a cooling medium within pipes 11 which overlie the outside surface of the bowl 6 and in particular are in sufficient heat-conductive contact therewith. The system of pipes 11 is connected into a circulating circuit which is not shown in the drawing and which inter alia includes a heat sink in order to take away the heat received through the walls of the bowl 6. Likewise, a control system 21, which for example detects the temperature of the bowl wall, is designed and installed for controlling the heat conveyed through the pipes 11 for the purpose of setting a defined internal temperature within the bowl 6.

On the face end 12 of the upper part 4 is fixed a collar 13 consisting of an elastic rubber material for example and which overlies the end 12 on the side facing the bowl chamber. The collar 13 in particular overlies the annular gap 8 and its outer margin is fixed by means of a shaped bead 14 in an annular groove 15 of the abutment ring 7, the groove extending concentrically in relation to the shaft 2.

The materials to be treated in the laboratory centrifuge are located in the receptacles which are not shown in the drawing and which are receivable in the centrifuge rotor mentioned above. This treatment may take place, depending upon the properties of the materials, at temperatures lower than the ambient temperature. For this purpose, the bowl is first cooled to a desired temperature by means of a coolant flowing through the pipes 11, after which the centrifuging treatment begins. The cooling of the walls of the bowl 6 as well as of the abutment ring 7, particularly due to thermal radiation may result in a corresponding cooling of the housing of the electric motor 1, particularly the upper part 4 as well as of elements which are in direct heat-conducting contact therewith. Depending upon the amount of cooling, the winding system of the electric motor 1 is at this point electrically powered to produce a heating of the internal chamber of the motor as well as of the parts which are thermally influenced by the bowl 6 and by the abutment ring 7, so that as a consequence no position on these motor elements drops below a dew point and consequently cause the formation of condensation.

Depending upon the system of the electric motor 1, the electric powering may include a powering of stator windings and/or rotor windings (collectively, 17), and for such heating one can use direct-current drives and three-phase-current drives or, generally, multiphase alternating current-drives. The electrical powering of the winding system results in each case from a voltage and a frequency which cause no rotational movement of the motor. The choice of the necessary electrical parameters needed to fulfil this condition will be familiar to the skilled person and therefore do not need to be described further.

In the simplest case, the standstill heating of the electric motor 1 according to the invention is effected according to an established standardized heat-generating capability which is determined on the basis of the most unfavorable conditions, that is conditions resulting in a maximum cooling effect of the coolant flowing through the pipes 11, thereby to avoid any part of the motor which is thermally influenced by the bowl chamber falling below a dew point. The standstill heating can, however, vary according to the actual thermal effect which is to be dealt with, in practice by means of one or more sensors 19 which detect the temperature at the critical part or parts of the thermally affected motor components, wherein the heating power to be expended is determined in dependence upon the cooling which is established in this way.

A particular advantage of the invention is that in order to prepare for such standstill heating no additional heating elements need to be provided within the motor. Rather, user is made of structural elements which are already present, namely the winding elements of the rotor and/or of the stator. Accordingly, existing laboratory centrifuges can be equipped in accordance with the invention in a simple manner and at low cost, with the advantage that corrosion effects due to condensation within the motor are avoided, particularly in the areas of electrical contacts and bearing elements, thereby avoiding repair or other significant consequential costs.

What is claimed is:

1. A laboratory centrifuge comprising:
   a bowl capable of being cooled;
   a centrifuge rotor mounted within said bowl, said centrifuge rotor being capable of receiving a plurality of receptacles for receiving materials to be treated by centrifuging;
   an electric motor for rotating said rotor;
   a standstill heating means for maintaining all points of said electric motor at a temperature above a dew point while a material-specific cooling temperature is maintained within said bowl; and
   control means for automatically activating said standstill heating means as a function of a temperature of an internal chamber of said bowl.

2. The laboratory centrifuge of claim 1, wherein said standstill heating means is activatable to provide a constant heating power.

3. The laboratory centrifuge of claim 2, further comprising:
   a control device connected to said standstill heating means for activating said standstill heating means under predeterminable conditions to provide a predeterminable heating power; wherein said standstill heating means comprises a winding system of a stator and/or a rotor of said electric motor.

4. The laboratory centrifuge of claim 1, wherein said standstill heating means is activatable to provide a variable heating power corresponding to an internal temperature of said bowl.

5. The laboratory centrifuge of claim 4, further comprising:
   a temperature sensor for detecting an internal temperature of said bowl; and
   a control circuit connected to said temperature sensor for controlling the heating power of said standstill heating means as a function of said internal temperature of said bowl.

6. The laboratory centrifuge of claim 5, further comprising:
   a control device connected to said standstill heating means for activating said standstill heating means under predeterminable conditions to provide a predeterminable heating power; wherein said standstill heating means comprises a winding system of a stator and/or a rotor of said electric motor.

7. The laboratory centrifuge of claim 4, further comprising:
   a control device connected to said standstill heating means for activating said standstill heating means under predeterminable conditions to provide a predeterminable heating power; wherein said standstill heating means comprises a winding system of a stator and/or a rotor of said electric motor.

8. The laboratory centrifuge of claim 1, further comprising:
   a temperature sensor for detecting an internal temperature of said bowl; and
   a control circuit connected to said temperature sensor for controlling the heating power of said standstill heating means as a function of said internal temperature of said bowl.

9. The laboratory centrifuge of claim 8, further comprising:
   a control device connected to said standstill heating means for activating said standstill heating means under predeterminable conditions to provide a predeterminable heating power; wherein said standstill heating means comprises a winding system of a stator and/or a rotor of said electric motor.

10. The laboratory centrifuge of claim 1, further comprising:
    a control device connected to said standstill heating means for activating said standstill heating means under predeterminable conditions to provide a predeterminable heating power; wherein said standstill heating means comprises a winding system of a stator and/or a rotor of said electric motor.

11. A method of maintaining the temperature of an electric motor of a laboratory centrifuge above a dew point when a centrifuge rotor mounted within a bowl of said centrifuge is being cooled, said method comprising:
    (a) sensing a temperature of the centrifuge;
    (b) heating said electric motor when said temperature of the centrifuge is at or below a predetermined temperature and said centrifuge rotor is not being rotated by said electric motor; and
    (c) providing sufficient heat in step (b) to maintain substantially all areas of said electric motor above the dew point.

12. The method of claim 11 wherein step (b) comprises the step of passing electric current through a winding system of said electric motor.

13. The method of claim 12 wherein step (b) comprises the step of passing electric current through a winding of a stator of said electric motor.

14. The method of claim 12 wherein step (b) comprises the step passing electric current through a rotor of said electric motor.

15. The method of claim 11 wherein said bowl has an internal chamber, and step (a) comprises the step of sensing the temperature within said internal chamber.

16. The method of claim 11 further comprises the step of controlling a heating power during said heating of step (b).

17. A laboratory centrifuge comprising:
- a bowl capable of being cooled, said bowl having an internal chamber;
- a centrifuge rotor mounted within said bowl, said centrifuge rotor being capable of receiving a plurality of receptacles for receiving materials to be treated by centrifuging;
- an electric motor for rotating said centrifuge rotor;
- a heater disposed in said centrifuge to heat all points of said electric motor to a temperature above a dew point while a cooling temperature is maintained within said bowl; and
- control means for automatically activating said heater as a function of the cooling temperature only when said centrifuge rotor is not being rotated.

18. The laboratory centrifuge of claim 17 wherein said heater is disposed within said electric motor.

19. The laboratory centrifuge of claim 18 wherein said motor includes windings, and said heater comprises said windings.

* * * * *